US006860288B2

(12) United States Patent
Uhler

(10) Patent No.: US 6,860,288 B2
(45) Date of Patent: Mar. 1, 2005

(54) SYSTEM AND METHOD FOR MONITORING AND CONTROLLING UTILITY SYSTEMS

(76) Inventor: Kenneth J. Uhler, 1553 Cordova Ave., Lakewood, OH (US) 44107

( * ) Notice: Subject to any disclaimer, the term of this patent is extended or adjusted under 35 U.S.C. 154(b) by 0 days.

(21) Appl. No.: 10/784,399

(22) Filed: Feb. 23, 2004

(65) Prior Publication Data

US 2004/0163705 A1 Aug. 26, 2004

Related U.S. Application Data

(63) Continuation-in-part of application No. 10/026,002, filed on Dec. 21, 2001, now Pat. No. 6,696,961.

(51) Int. Cl.$^7$ ................................................ E03B 7/07
(52) U.S. Cl. ...................... 137/552; 137/357; 137/551; 137/312; 251/129.04
(58) Field of Search ................................ 137/551, 552, 137/357, 312; 251/129.04

(56) References Cited

U.S. PATENT DOCUMENTS

| | | | |
|---|---|---|---|
| 4,180,088 A | 12/1979 | Mallett | |
| 4,324,268 A | 4/1982 | Jacobson | |
| 4,562,865 A | 1/1986 | Lemkin et al. | |
| 4,589,435 A | 5/1986 | Aldrich | |
| 4,921,211 A | 5/1990 | Novak et al. | |
| 5,000,224 A | 3/1991 | Olson, Jr. et al. | |
| 5,004,014 A | 4/1991 | Bender | |
| 5,062,442 A | 11/1991 | Stentrom et al. | |
| 5,086,526 A | * 2/1992 | Van Marcke | 4/623 |
| 5,086,806 A | 2/1992 | Engler et al. | |
| 5,176,320 A | 1/1993 | Kraus et al. | |
| 5,217,035 A | * 6/1993 | Van Marcke | 137/1 |
| 5,240,028 A | * 8/1993 | Hoch et al. | 137/80 |
| 5,251,653 A | * 10/1993 | Tucker et al. | 137/460 |
| 5,568,825 A | * 10/1996 | Faulk | 137/624.11 |
| 5,655,561 A | * 8/1997 | Wendel et al. | 137/79 |
| 5,893,388 A | 4/1999 | Luker | |
| 5,971,011 A | 10/1999 | Price | |
| 6,129,103 A | 10/2000 | Fields et al. | |
| 6,701,951 B1 | * 3/2004 | Drinkwater | 137/78.1 |

OTHER PUBLICATIONS

Delta Control Products, Inc., *Delta D Series Electric Non–spring Return Actuator*, Technical Bulletin, D Series Literature No. 34–636–836, Rev. B, date unknown, pp. 1–6.
Safe Home Products, *Safety/Emergency Products WaterCop, WaterHound & FreezeHound*, Internet Website, printed on Dec. 10, 2001 at http://safehomeproducts.com/SHP/SM.Water_cop.asp.

* cited by examiner

*Primary Examiner*—A. Michael Chambers
(74) *Attorney, Agent, or Firm*—Fay, Sharpe, Fagan, Minnich & McKee, LLP

(57) ABSTRACT

A system for monitoring and controlling one or more utility systems includes a utility system main supply line for supplying a utility to at least one of a structure, an area and a building and a controlled shut-off device on the utility system main supply line. The controlled shut-off device is bias toward an open position and is movable toward a closed position upon receipt of an actuation signal wherein the utility is prevented from passing by the controlled shut-off device. A main utility sensor is on the utility system main supply line and a motion sensor that detects occupancy is in the building. A processor communicates with the controlled shut-off device, the main utility sensor and the motion sensor. The processor sends the actuation signal to the controlled shut-off device to move the controlled shut-off device toward the closed position when input from the main utility sensor and the motion sensor indicates occurrence of an abnormal event.

26 Claims, 1 Drawing Sheet

SYSTEM AND METHOD FOR MONITORING AND CONTROLLING UTILITY SYSTEMS

This application is a continuation-in-part of U.S. patent application Ser. No. 10/026,002 filed Dec. 21, 2001 and new U.S. Pat. No. 6,696,961, which is expressly incorporated herein by reference.

BACKGROUND OF THE INVENTION

1. Field of the Invention

The present invention relates to a system and method for monitoring and controlling one or more utility systems. More particularly, the present invention relates to a system and method that monitors one or more utility systems and selectively disables or disconnects the one or more utility systems at select locations. The present invention finds particular application in conjunction with the utility systems of a building or structure, including a gas or oil supply system, a water supply system and/or an electric supply system and will be described with particular reference thereto. However, it is to be appreciated that the present invention is also usable in other applications and environments.

2. Discussion of the Art

Residential and commercial buildings typically include one or more of the following systems: a water supply system, a gas or oil supply system and an electric supply system. The water supply system provides running water to the building or structure from a city water supply source, a well, a cistern or the like. The gas or oil supply system provides gas, such as natural gas or oil, to the building and the electric supply system provides electricity, often remotely generated, to the building. Within the building, each of these systems distributes water, gas/oil and power to specific rooms or areas as well as to specific consuming devices and appliances.

Failure of one or more of these systems can cause problems ranging in scope from merely inconvenient (e.g., a minor water leak, an overloaded electrical circuit or electrical appliance malfunction, blown fuse/tripped circuit breaker, etc.) to catastrophic (e.g. a natural gas explosion, electrical fire, flooded basement, etc.). Oftentimes, a relatively minor failure of one of the utility systems is not too problematic or damaging, but when the relatively minor failure remains unchecked for an extended period the damages can become substantial. For example, a minor water leak from a pipe in the basement of a home typically does not immediately cause much damage. However, if the water leak is not promptly repaired or the water shut off, the water leaking from the pipe can accumulate overtime and cause extensive damage to the home and/or its contents.

Failure of the utility systems can be attributed or can result from a variety of circumstances. For a domestic water supply system, cold weather is often the culprit. Water pipes are often susceptible to freezing and rupturing due to cold weather, particularly during cold weather months. More particularly, water in the pipes subjected to freezing temperatures may freeze and expand potentially causing a rupture in the pipes. Moreover, at cooler temperatures, the pipes tend to become more brittle and thus more subject to rupturing.

Old age is also a frequent contributor to utility system failure. For example, water pipes and the fittings and seals used to connect water pipes to each other and other appliances tend to deteriorate over time with failure becoming more likely. Water using or consuming appliances also deteriorate over time and their connections to water pipes become more susceptible to leaking as well as failure of the appliance itself (e.g., water using/consuming device or appliance, such as, for example, water heaters, boilers, washing machines, ice makers, lawn sprinkler systems, etc.). Similarly, gas pipes often deteriorate over time increasing the likelihood of a gas leak. Electrical wiring and associated components (i.e., electrical outlets, electrical appliances/devices, junction boxes, etc.) also deteriorate over time which results in the increased likelihood of an electrical fire.

Another contributor to utility system failure is uncommon or extraordinary events, including natural disasters, severe inclement weather, earthquakes, tornados, hurricanes and the like. These events are capable of forcefully damaging the water, gas and electrical infrastructure of a building directly or indirectly by first damaging their supporting structures. Additionally, during freezing temperatures, a storm may cause an electrical power service interruption to a building potentially rendering the heating system, if electrical, inoperative. Without heat, the freezing temperatures may cause the water pipes to freeze.

One method of reducing the damaging effect or likelihood of further damage after a utility system failure is to disable the failing utility system. In the case of a water system failure, a main water shut-off valve is often provided which can be manually closed to disable the flow of all water into a building thereby preventing further water leakage into the building. Alternatively, water using or consuming devices and nearby water distribution lines often include local shut-off valves that can be manually disabled to prevent further water flow to the water using or consuming device. Similarly, gas lines often include a main shut-off valve and local shut-off valves that are manually operated. Likewise, electrical systems often include a fuse box or circuit breaker box that can include a main shut-off switch as well as local switches located at various points remote from the fuse/circuit breaker box.

Although manual shut-off valves and switches are useful in some circumstances, they often fail to adequately protect the building in which they are employed in many other circumstances, such as when the building is unoccupied. Unoccupied buildings are often susceptible to the most damage from a utility system failure because no one is available to realize that a utility system has failed and take appropriate measures to mitigate the damages from the utility system failure, such as shut off one or more of the utility systems in the building. Aside from damage, a failed utility system in an unoccupied building will often allow wasted incoming fresh water, gas and/or electricity to occur which will later be charged to the owner or tenant of the building.

Thus, there is a need for a system to monitor and control one or more utility systems in a building and desirably the system is able to mitigate damages from a failed utility system even if the building is unoccupied thereby capping or reducing damages to the building and unnecessary waste.

BRIEF SUMMARY OF THE INVENTION

In accordance with one aspect of the present invention, a system for monitoring and controlling one or more utility systems is provided. More particularly, in accordance with this aspect, the system includes a utility system main supply line for supplying a utility to at least one of a structure, an area and a building and a controlled shut-off device on the utility system main supply line. The controlled shut-off device is bias toward an open position and is movable toward a closed position upon receipt of an actuation signal wherein the utility is prevented from passing by the controlled shut-off device. A main utility sensor is on the utility system main supply line and a motion sensor that detects occupancy is in the building. A processor communicates with the controlled shut-off device, the main utility sensor and the motion sensor. The processor sends the actuation signal to the controlled shut-off device to move the controlled shut-off device toward the closed position when input from the main utility sensor and the motion sensor indicates occurrence of an abnormal event. Optionally, an audible alarm is also actuated to alert the occupants of a detected fault and/or corrective action.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE INVENTION

Figure 1:
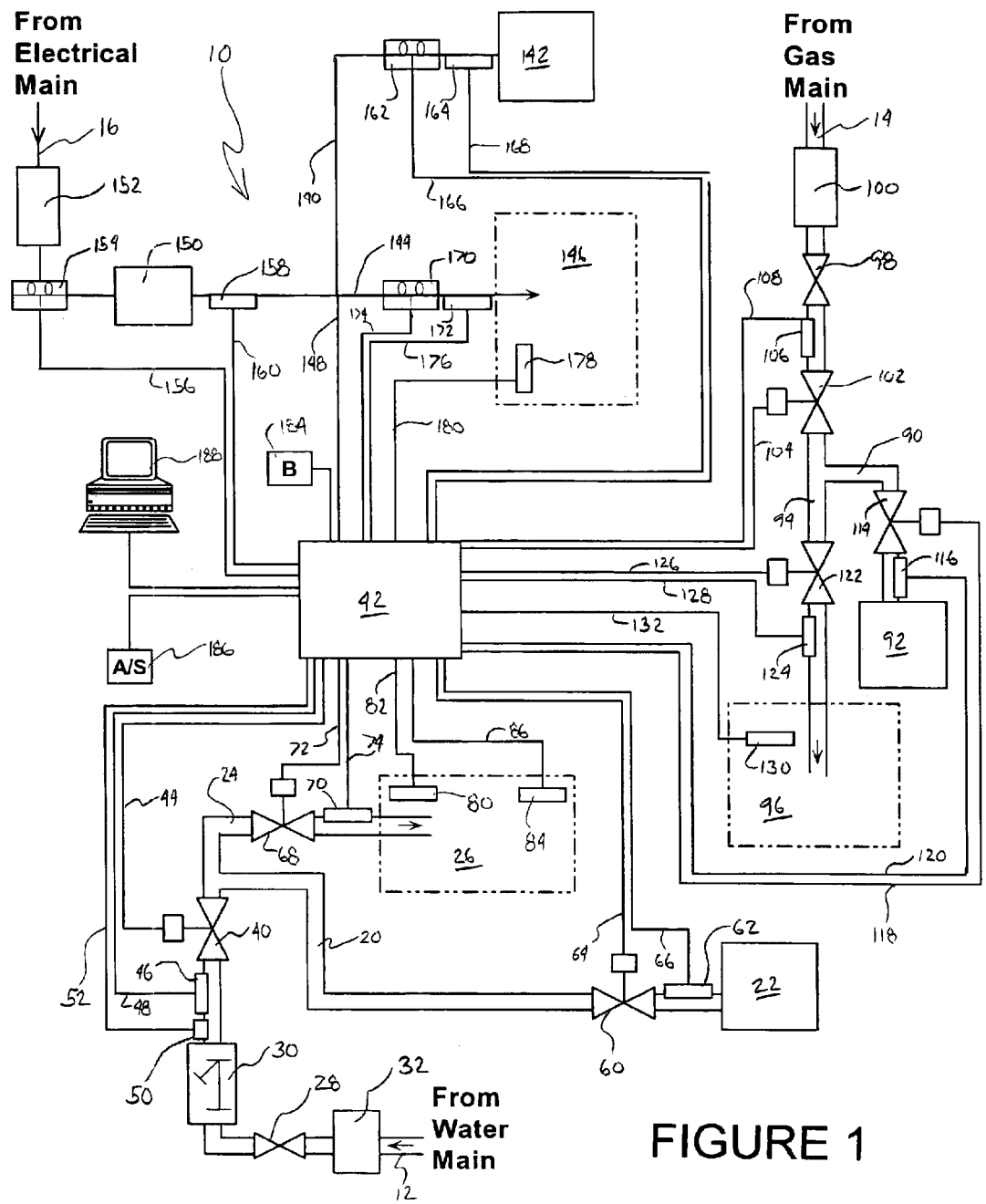
FIG. 1 is a schematic illustration of a system that monitors and controls a domestic water supply system, gas supply system and an electric supply system in accordance with a preferred embodiment of the present invention.

Referring now to the drawing(s) wherein the showings are for purposes of illustrating a preferred embodiment of the invention and not for purposes of limiting the same, a utility system for monitoring and controlling one or more utility systems is schematically shown in FIG. 1 and generally designated by reference numeral 10. The illustrated system 10 includes a water system main supply line 12 for supplying water to a building (not shown), a gas system main supply line 14 for supplying gas to the building and an electric system main supply line 16 for supplying electricity to the building. Alternatively, a structure, designated area or the like that is not necessarily a building could be substituted for the building, including, for example, fountains, patios and decks, halogen sprinkler systems, parking decks, etc. Although the system 10 is shown and described as having three utility systems, it should be understood that the system could be modified and used with less than three utility systems or more than three utility systems as well as with various types of utility systems, including those other than water, gas and electric (such as, for example, an oil system for supplying oil to the building), and any combinations of utility systems. As will be described in more detail below, the system 10 can include one or more main controlled shut-off devices, one or more main sensors, one or more local controlled shut off devices, one or more local sensors, one or more motion sensors, one or more other sensors and/or one or more processors. The number of sensors and control shut off devices is often determined by the application of the system in which it is being installed.

In the illustrated embodiment, the water main supply line 12 is shown branching into a first section 20 that leads to a water consuming and/or using device or appliance 22 and a second section 24 that leads to a room 26 which can also or alternately be a specified or designated area or a distinct water circuit 26. The device or appliance 22 can be any water using or consuming device or appliance, including, for example, a water heater, boiler, dishwasher, sink, shower, ice maker, washer, etc. Although only one water consuming/using device and one room are shown in FIG. 1 connected to the main supply line 12, it should be understood that the supply line 12 could branch into many more distribution lines to provide water to other additional water using/consuming devices and/or to other additional rooms. The water supply line 12 typically includes a conventional, manually-operated main water shut-off valve 28 for preventing water from passing therethrough. Thus, in the event of a leak or necessary service on water lines or appliances downstream from the supply line 12, the shut-off valve 28 can be manually closed to prevent water from continuing to flow, potentially mitigating damage caused in the case of a water leak. An in-line strainer 30 and a water meter 32 are also provided on the supply line 12. The strainer 30 is used to prevent any significantly-sized foreign objects and/or debris from passing downstream and the meter 32 is used to record how much water is consumed.

The system 10 includes a controlled main water device or valve 40 on the main water line 12 connected to a processor 42 for communication therewith. In the illustrated embodiment, the connection between the water valve 40 and the processor 42 is shown as line 44 which is intended to schematically represent any connecting or communicating means between the valve 40 and the processor 42, including, without limitation, a wire connection, a wireless connection or any other conventional connection (such as fiber optics, etc.) that allows communication between a processor and a valve. The valve 40 can be a ball valve having a valve controller or any other type of fluid valve that operates or toggles between a closed position prohibiting or limiting fluid flow therethrough and an open position allowing fluid flow therethrough. More particularly, the control valve 40 is operatively mounted along the line 12 and usually positioned downstream of the manual shut-off valve 28. The valve 40 is normally bias or urged toward or to an open position allowing water to flow freely therethrough and is movable toward or to a closed position upon actuation or receipt of an actuation signal for preventing water from passing therethrough as will be described in more detail below.

The system 10 further includes a main water flow sensor 46 adjacent to and, preferably, upstream of the valve 40. The sensor 46 is a sensing device or means capable of detecting or measuring fluid flow through the line 12. The sensor 46 is connected to the processor for communication therewith and, like the line 44, the communication line 48 between the processor 42 and the sensor 46, and all communication line discussed herein and below, can be a hard wire connection, a wireless connection or any other type of communicating connection. Optionally, a pressure sensor 50 is provided on the main line 12 for measuring a pressure in the line 12 and communicating said pressure to the processor 42 through a communication line 52.

A first local water controlled shut-off device or valve 60, spaced downstream from the valve 40, is disposed on the first section 20 adjacent the appliance 22. Like the valve 40, the valve 60 is normally bias or urged toward or to an open position and movable toward or to a closed position upon receipt of an actuation signal from the processor 42 whereby the valve 60 would prevent water from passing through to the appliance 22. A first local water sensor 62 is positioned adjacent the valve 60 for monitoring water flow through the section 20 to the appliance 22. The valve 60 and sensor 62 communicate with the processor 42 through communication lines 64,66.

A second local water controlled shut-off device or valve 68, spaced downstream from the valve 40, is disposed on the second section 24 adjacent the room 26. Like the valves 40,60, the valve 68 is normally bias or urged toward or to an open position and movable toward or to a closed position upon receipt of an actuation signal from the processor 42 whereby the valve 68 would prevent water from passing through to the room 26. A second local water sensor 70 is positioned adjacent the valve 68 for monitoring water flow through the section 24 to the room 26. The valve 68 and the sensor 70 communicate with the processor 42 through communication lines 72,74.

The system 10 includes at least one motion sensor for detecting occupancy in the building and indicating to the processor 42 whether the building is occupied. Motion sensors can include all conventional types of motion sensors, including those operating by infra red, heat, other type of trip wire, etc. In the illustrated embodiment, the system 10 includes a first motion sensor 80 in the room 26 for detecting occupancy in the room 26. The sensor 80 indicates whether the room 26 is occupied and communicates with the processor 42 through a communication line 82. Alternatively, other types of sensors can be used for detecting occupancy, in addition to the motion sensor or sensors of the system 10 or independently. Other types of sensors could include, for example audio sensors. Audio sensors, or vibration sensors, can be strategically positioned to record voices, movement, vibrations or the like. Optionally, feedback from the audio sensors can be compared to "normal" occupied or unoccupied audio patterns of a home or building to determine whether there is occupancy. Audio sensors may be particularly desirable when room aesthetics make the use of motion sensors undesirable. Additionally, the system 10 can include a temperature sensor 84 in the room 26 for monitoring or measuring a temperature of the room 26 and communicating the temperature to the processor 42 through communication line 86.

The gas main supply line 14 is illustrated as branching into a first section 90 that leads to a gas consuming or using device or appliance 92 and a second section 94 that leads to a room 96. Like the room 26, the room 96 can alternately be a specified or designated area or a distinct gas circuit. The gas device or appliance 92 can be any gas using or consuming device, including, for example, a water heater, boiler, furnace, gas grill, range or oven, dryer, etc. Although only one gas device 92 and one gas-supplied room 96 are shown in FIG. 1 connected to the main supply line 14, it should be understood that the supply line 14 could branch into multiple distribution lines to provide gas to other additional gas using/consuming devices and/or to other additional gas-supplied rooms. Moreover, although the device 92 and the room 96 are shown as distinct from the water device 22 and the water-supplied room 26, it should be understood that a single device could be supplied by both water and gas (a boiler, for example) and, likewise, a single room could be supplied by both water and gas.

The gas supply line 14 includes a conventional, manually-operated main gas shut-off valve 98 for preventing gas from passing thereby such as might be necessary in the event of a gas leak or service on the line 14 or other lines downstream from the valve 98. A gas meter 100 is typically provided near the valve 98 for recording or measuring how much gas is consumed. A controlled main gas shut-off device or valve 102 is provided on the line 14 and is connected to the processor 42 by a communication line 104 for communicating with the processor 42. The valve 98 can be any suitable control valve that operates or toggles between a closed position prohibiting or limiting gas flow therethrough and an open position allowing gas flow therethrough.

More particularly, the valve 102 is operatively mounted along the line 14 and usually positioned downstream of the manual shut-off valve 98. The valve 102 is normally bias or urged toward or to an open position allowing gas to flow freely therethrough and is movable toward or to a closed position upon actuation or receipt of an actuation signal for preventing gas from passing therethrough as will be described in further detail below. A main gas flow sensor 106 is positioned on the line 14 adjacent to and, preferably, upstream of the valve 102. The sensor 106 is a sensing device or means that detects or measures gas flow through the line 14 and, via a communication line 108, communicates the detected or measured gas flow to the processor 42.

A first local gas controlled shut-off device or valve 114, spaced downstream from the valve 102, is disposed on the first section 90 adjacent the device 92. Like the valve 102, the valve 114 is normally bias or urged toward or to its open position and movable toward its closed position upon receipt of an actuation signal from the processor 42 whereby the valve 114 would prevent gas from passing through to the device 92. A first local gas sensor 116 is positioned adjacent the valve 114 for monitoring gas flow through the section 90 to the device 92. The valve 114 and the sensor 116 communicate with the processor 42 through respective communication lines 118,120.

A second local gas controlled shut-off device or valve 122, spaced downstream from the valve 102, is disposed on the second section 94 adjacent the room 96. Like the valves 102,114, the valve 122 is normally bias or urged toward or to an open position and movable toward a closed position upon receipt of an actuation signal from the processor 42 whereby the valve 122 prevents gas from passing through to the room 96. A second local gas sensor 124 is positioned adjacent the valve 122 for monitoring gas flow through the section 94 to the room 96. The valve 122 and the sensor 124 communicate with the processor 42 through communication lines 126,128. A second motion sensor 130 is provided in the room 96 for detecting occupancy therein. The sensor 130 indicates whether the room 96 is occupied and communicates with the processor 42 through a communication line 132.

The electric main supply line 16 is illustrated as branching into a first section 140 that leads to an electric powered device or appliance 142, a second section 144 that leads to a room 146 and a third section 148 that supplies power to the processor 42. Like the rooms 26 and 96, the room 146 can alternately be a specified or designated area or a distinct electrical circuit. The electric device 142 can be any electrically powered device, including, for example, an electrically powered or ignited water heater, boiler or furnace, an electric range or oven, a dishwasher, a light, electric outlets, an electric fan, a microwave, a refrigerator, a washer or dryer, etc. Although only device 142 and room 146 are shown in FIG. 1, it should be understood that the supply line 16 could branch into multiple lines to provide electricity to other additional electrical devices and/or to other additionally electrically-supplied rooms. Moreover, although the device 142 and the room 146 are shown as distinct from the devices 22,92 and the rooms 26,96, it should be understood that a single device could be supplied by water, gas and/or electricity and, likewise, a single room could be supplied by water, gas and/or electricity.

The electric supply line 16 includes a conventional, manually operated main shut-off switch (not shown) within a circuit-breaker or fuse box 150 for preventing electricity from passing thereby, such as might be necessary in the event of an electrical short or service on the line 16 or other lines downstream from the box 150. An electricity meter 152 is typically provided near the box 150 for recording or measuring how much electricity is consumed. A controlled main electric shut-off device or switch 154 is provided on the line 16 and is connected to the processor 42 by a communication line 156 for communicating with the processor 42. The switch 154 can be any suitable control switch that operates or toggles between a closed position prohibiting or limiting electricity flow thereby and an open position allowing electricity to flow therethrough.

More particularly, the switch 154 is operatively located along the line 16 and usually positioned downstream of the box 150. The switch 154 is normally bias or urged toward or to the open position allowing electricity to flow freely therethrough and is movable toward or to the closed position upon actuation or receipt of an actuation signal for preventing electricity from passing therethrough as will be described in further detail below. A main electric flow sensor 158 is positioned on the line 16 adjacent to the switch 154. The sensor 158 is a sensing device or means that detects or measures electricity flow through the line 16 and, via a communication line 160, communicates the detected or measured electricity flow to the processor 42.

A first local electric controlled shut-off device or switch 162, spaced downstream from the switch 154, is disposed on the first section 140 adjacent the device 142. Like the switch 154, the switch 162 is normally bias or urged toward or to an open position and movable toward or to a closed position upon receipt of an actuation signal from the processor 42 whereby the switch 162 would prevent electricity from passing through to the device 142. A first local electricity sensor 164 is positioned adjacent the switch 162 for monitoring electricity flow through the section 140 to the device 142. The switch 162 and the sensor 164 communicate with the processor 42 through respective communication lines 166,168.

A second local electric controlled shut-off device or switch 170, spaced downstream from the switch 154, is disposed on the second section 144 adjacent the room 146. Like the switches 154,162, the switch 170 is normally bias or urged toward or to an open position and movable toward or to a closed position upon receipt of an actuation signal from processor 42 whereby the switch 170 prevents electricity from passing through to the room 146. A second local electricity sensor 172 is positioned adjacent the switch 170 for monitoring electricity flow through the section 144 to the room 146. The switch 170 and the sensor 172 communicate with the processor 42 through communication lines 174,176. A third motion sensor 178 is provided in the room 146 for detecting occupancy therein. The sensor 178 indicates whether the room 146 is occupied and communicates with the processor 42 through a communication line 180.

The processor 42, which can alternatively be a plurality of processors, is further connected to back-up power source 184 such as one or more batteries. The back-up power source 184 is provided such that the processor 42 is powered in the event power is not supplied to the processor 42 through the section 148, such as in the event and/or a power failure. If desirable, the processor can additionally be connected to an alarm and/or security system 186 and an external computer 188. The system 186 is used to announce actuation signals sent by the processor 42 and the computer 188 can be used for one or more of programming the processor, recording actions or functions of the processor, converting actions or functions of the processor 42 for use by a feedback device, such as a monitor and/or a printer, connecting the processor to a network, etc.

The system 10 is also capable of communicating the ambient conditions recorded in the building, including potentially dangerous and/or undesirable conditions, such as freezing temperature, excessive heat or fire, lack of water pressure, moisture and/or water, water flow and occupancy. This information can be communicated through the system 186, monitored remotely over a network such as the internet or monitored through any communication device suitable for communicating with the processor 42. It is anticipated that system 186 could be a continuously and remotely monitored home security system so that such conditions could be monitored by a security company or any other designated person or entity.

In operation, the processor 42 serves as a means for collecting data from the various sensors of the system, a means for processing the collected data and a means for determining if the data collected indicates an occurrence of an abnormal event. More particularly, the processor 42 receives communications from the various sensors of the system 10, including the motion sensors 80, 130, 178; the water flow sensors 46, 62, 70; the gas flow sensors 106, 116, 124; the electricity flow sensors 158, 164, 172; the temperature sensor 84 and the pressure sensor 50. The processor 42 continuously reviews the input it receives from the sensors and differentiates between normal utility usage and an abnormal event. If an abnormal event is indicated by the sensor input, the processor 42 sends one or more actuation signals to one or more shut-off devices to selectively shut-off all or a portion of the utilities in the system 10. The exact operation of the processor 42 depends on the programming or software utilized in or with the processor 42.

In a basic implementation of the system 10, the processor 42 will send actuation signals to main utility shut-off devices 40,102,154 to shut down the utilities whenever more than a preset amount of one of the utilities is used over a predetermined period and/or whenever one of the utilities is used continuously for more than said predetermined period. Thus, if water sensor 46 indicates more water is being used than said preset amount over said predetermined period of time, the processor 42 could send actuation signals to the shut-off devices 40, 102, 154 to disable the utilities entering the building. Alternatively, if water sensor 46 indicates water is being used continuously for more than said predetermined period of time, the processor could send actuation signals to the shut-off devices.

In another basic implementation of the system 10, the processor could simply be used to monitor the utilities when the motion sensor indicates that a room or the building is unoccupied or is occupied but there is no motion, such as when the occupants are asleep. If a sensor determines a utility is being used more than a preset amount when the building is unoccupied or no motion is occurring as indicated by the motion sensor, the processor can read this input as an abnormal event. In such a case where an abnormal event is indicated, the processor would send an actuation signal to one or more of the controlled shut-off devices to move the one or more controlled shut-off devices to their respective closed positions to disable usage of the utility beyond the one or more controlled shut-off devices. Additionally, the processor 42 could differentiate between when the building is occupied with motion and when the building is unoccupied or occupied without motion. When occupied with motion, the processor might use higher preset amounts or longer predetermined periods of time than when the building is unoccupied or occupied without motion.

In yet another basic implementation of the system 10, the processor could be used to monitor the temperature in the building through temperature sensor 84. This could include monitoring for freezing temperatures or temperatures indicative of a possible fire. In the event of a fire, the processor 42 could send appropriate signals to shut off the utility systems (especially the gas system) which could reduce the likelihood of a catastrophic gas explosion occurring as a result of the fire.

In a more advanced implementation of the system 10, the processor 42 will use the input from the sensors to determine that an abnormal event is occurring and will determine the extent to which the processor needs to disable the system or portions of the system to contain the effects of the abnormal event. The abnormal event could depend on factors such as the time of day, the particular device consuming a utility, the day of the week, the outside temperature, etc. For example, the processor may be programmed to allow continuous water usage during morning hours to accommodate for showers in a residential building. The processor may be programmed to allow a device, such as a lawn sprinkling system, to use more water than another device, such as a sink. Additionally, the processor may be programmed to allow a greater amount of electric and/or gas to be used during periods where relatively high or low temperatures are recorded.

Moreover, since the abnormal event could be localized or system-wide, the more advanced implementation of the system 10 could react globally or locally based on the type (local or system-wide) of abnormal event. For example, with reference back to FIG. 1, a system-wide abnormal event could occur when none of the motion sensors 80, 130, 178 indicate occupancy and the main water flow sensor 46 indicates an excessive amount of flow and/or more than a specified amount of water flow for more than a specified period of time, such as may occur after a water pipe explodes. In this case, the processor 42 may send actuation signals to the main water shut-off valve 40 to disable water usage downstream therefrom and, additionally, actuation signals to the gas shut-off valve 102 and the electric shut-off switch 154 to prevent further damage. A local abnormal event could occur, for example, when a particular motion sensor, such as sensor 80, indicates a particular room 26 is unoccupied and a water flow sensor 70 monitoring flow to the same room 26 indicates an excessive amount of flow and/or more than a specified amount of water flow for more than a specified period of time. In this case, the processor 42 may send an actuation signal to the local control shut-off device 68 to disable water flow only to the room 26.

Still further, in another advanced implementation of the system 10, the processor 42 could be programmed to learn usage patterns of the utilities in a particular building and to adjust what is considered an abnormal event as those usage patterns change and/or evolve. For example, as a family expands, its utility usage may gradually increase and the processor 42 could be programmed to accommodate this situation. Additionally, the system 10 is versatile and allows for the addition of other types and/or more sensors. Other types of sensors that could be added to the system 10 include moisture sensors, outdoor temperature sensors, etc.

As already discussed, although not limited to three utility systems, the system 10 has been illustrated and described in detail for use with three utility systems. To better illustrate the versatility of the system 10, it will now be described in reference to a signal utility (water). However, it should be understood that the following description of the operation of the system 10 concerning the water utility is applicable to the other utility systems. Accordingly, in one preferred implementation of the system 10, the processor 42 monitors occupancy through the motion sensor 80. Provided the motion sensor 80 detects motion, the processor 42 is in normal mode. When the motion sensor 80 fails to indicate motion for more than a preset period of time, the processor 42 goes to stand-by mode. As already discussed, many more motion sensors could be employed. For example, motion sensors could be located throughout a house, a building or the like. In the case of multiple motion sensors, stand-by mode does not occur until no motion is detected by any of the motion detectors for more than the preset period of time.

In normal mode, normal water flow is allowed. Normal water flow could be any water flow that does not occur continuously, as recorded by the processor 42, for more than a preset amount of time. The preset amount of time could be variable and could be set and/or changed through the processor 42. If continuous flow occurs for more than the preset amount of time, as monitored by a water flow sensor 40, the processor 42 would send an actuation signal to the valve 40 to close the valve 40 and disable water flow therethrough. In stand-by mode, a separate stand -by preset amount of time could be used. If water flow occurs continuously for more than the stand-by preset amount of time, the valve 40 is closed. The stand-by preset amount of time could be set to zero (0) to prevent any water flow when the building is unoccupied. When the valve 40 is closed, the processor 42 could actuate the alarm/security system 186 and/or selectively disable other utility systems through the shut-off devices 102,154.

Local sensor 62 could be used to monitor water flow to a particular device, such as, for example, an ice maker. If the processor 42 determines that too much water is flowing to the device 22 as detected by the sensor 62, the processor could close the valve 60 to disable the device 22. In a similar manner, the sensor 70 and valve 68 can be used to control water flow to the room 26. The temperature sensor 84 can additionally be employed to determine if the temperature drops to low in the room 26. In this case, the processor 42 could receive input from the sensor 84 which it compares to a preset temperature. If lower than the preset temperature, the processor 42 shuts off the valve 68. The pressure sensor 50 can also be used in addition to the flow sensor 46 or instead of the sensor 46 for monitoring water flow.

According to one preferred embodiment, when one of the water shut-off devices 40, 60, 68 receives an actuation signal from the processor 42, the shut-off device moves toward its closed position which takes a specified period of time, i.e. the valve closing period. The valve closing period could be any defined period but is about thirty (30) seconds in one preferred embodiment. During this period, the processor 42 will continue to receive input from the sensor adjacent the particular shut-off device being closed. If the sensor indicates that water flow has stopped prior to the expiration of the valve closing period, the valve will be returned to its open position. This allows for resetting of the system 10 whenever a valve is first closed by the processor 42.

For example, if someone is taking a shower and the system 10 determines that water has been running to the shower continuously for more than the predetermined period of time, the processor 42 sends an actuation signal to the valve that controls water flow to the shower and the valve begins to close. If alarm 186 is utilized, then the processor 42 may sound the alarm 186 to notify an occupant that water flow or usage has exceeded the predetermined period of time. The user of the shower may notice the decreased amount of water coming from the shower during the valve closing period and/or the alarm and manually shut-off the shower in the conventional manner for a specified period, such as, for example, one (1) second. The sensor nearest the shower would then indicate to the processor 42 that the water flow has stopped and the shower valve would be allowed to reopen. The processor 42 would then reset and await continuous flow for more than the predetermined period of time. If the water flow continues while the valve closing period passes, then the valve will close until the system 10 is manually reset through the processor or through a remote controller (not shown) connected to the processor. It should be understood by those skilled in the art that this shut-off device operation could be adapted for use with the other utility systems.

According to another preferred embodiment, when a shut-off device is closed and after a closed preset period of time, the shut-off device will reopen and the sensor adjacent thereto will check to see if the utility is still passing thereby. If yes, the shut-off device will reclose. If no, the shut-off device will open and the system 10 will reset. A delay may be utilized between the valve first opening after closing and processing input from the sensor. Such a delay could be useful in allowing water, for example, to pressurize and provide a more accurate reading. Alternately, in the water line 12, the pressure sensor 50 could be used to determine when input from the sensor should be checked after reopening of the shut-off device.

The invention has been described with reference to the preferred embodiments. Obviously, modifications and alternations will occur to others upon reading and understanding the preceding detailed description. It is intended that the invention be construed as including all such modifications and alterations insofar as they come within the scope of the appended claims or the equivalents thereof.

What is claimed is:

1. A system for monitoring and controlling one or more utility systems, comprising:
   a utility system main supply line for supplying a utility to at least one of a structure, an area and a building;
   a controlled shut-off device on said utility system main supply line, said controlled shut-off device bias toward an open position and movable toward a closed position upon receipt of an actuation signal wherein said utility is prevented from passing by said controlled shut-off device;
   a main utility sensor on said utility system main supply line that at least one of detects and monitors passage of said utility through said utility main supply line;
   a occupancy sensor in said building that detects occupancy;
   a processor communicating with said controlled shut-off device, said main utility sensor and said occupancy sensor, said processor sending said actuation signal to said controlled shut-off device to move said controlled shut-off device toward said closed position when input from both said main utility sensor and said occupancy sensor indicates occurrence of an abnormal event.

2. The system of claim 1 wherein the utility is one of gas, electric and water.

3. The system of claim 2 wherein the utility is one of gas and electric.

4. The system of claim 1 wherein said utility sensor and said occupancy sensor indicate said occurrence of said abnormal event when at least one of:
   (a) said occupancy sensor indicates that said building is unoccupied and said utility sensor indicates that said utility is one of (i) being used in excess of a specified unoccupied amount and (ii) being used continuously in excess of a specified unoccupied period of time; and
   (b) said occupancy sensor indicates that said building is occupied and said utility sensor indicates that said utility is one of (i) being used in excess of a specified occupied amount and (ii) being used continuously in excess of a specified occupied period of time.

5. The system of claim 4 wherein said controlled shut-off valve remains in said open position when said occupancy sensor detects that said building is unoccupied while said utility sensor indicates normal usage of said utility.

6. The system of claim 4 wherein said utility sensor and said occupancy sensor indicate said occurrence of said abnormal event when said occupancy sensor indicates that said building is occupied and said utility sensor indicates that said utility is one of (i) being used in excess of a specified occupied amount and (ii) being used continuously in excess of a specified occupied period of time.

7. The system of claim 1 further including:
   a local controlled shut-off device spaced downstream from said controlled shut-off device and adjacent an appliance that uses said utility, said local controlled shut-off device bias toward a local device open position and movable toward a local device closed position upon receipt of a local actuation signal wherein said utility is prevented from passing by said local controlled shut-off device;
   a local utility sensor adjacent said local controlled shut-off device; and
   said processor communicating with said local controlled shut-off device and said local utility sensor, said processor sending said local actuation signal to said local controlled shut-off device to move said local controlled shut-off device toward said local device closed position when input from said local utility sensor and said occupancy sensor indicates said occurrence of said abnormal event.

8. The system of claim 1 further including:
   a local controlled shut-off device spaced downstream from said controlled shut-off device and upstream from one of a room, a designated area and a circuit to which said utility is supplied, said local controlled shut-off device bias toward a local device open position and movable toward a local device closed position upon receipt of a local actuation signal wherein said utility is prevented from passing by said local controlled shut-off device;
   a local utility sensor adjacent said local controlled shut-off device; and
   said processor communicating with said local controlled shut-off device and said local utility sensor, said processor sending said local actuation signal to said local controlled shut-off device to move said local controlled shut-off device toward said local device closed position when input from at least one of said local utility sensor and said occupancy sensor indicates said occurrence of said abnormal event.

9. The system of claim 8 wherein said local controlled shut-off device is upstream of one of said room and said designated area, and said occupancy sensor is positioned in said one of said room and said designated area.

10. The system of claim 1 further including:
   a plurality of local controlled shut-off devices downstream from said controlled shut-off device, each of said plurality of local controlled shut-off devices bias toward a local device open position and movable toward a local device closed position upon receipt of a local actuation signal from said processor wherein said utility is prevented from passing thereby;
   a plurality of local utility sensors associated with said plurality of local controlled shut-off devices; and said processor communicating with said plurality of local controlled shut-off devices and said plurality of local utility sensors; said processor sending said local actuation signal to one of said plurality of local controlled shut-off devices when input from said plurality of local utility sensors and said occupancy sensor indicates said occurrence of said abnormal event.

11. The system of claim 10 wherein said processor includes:
- a means for collecting data from said main utility sensor and said plurality of local utility sensors;
- a means for processing said collected data; and
- a means for determining if said input is indicating said occurrence of said abnormal event based on said collected data.

12. The system of claim 1 wherein communication between said processor and said controlled shut-off device, main utility sensor and said occupancy sensor occurs through wires or wirelessly.

13. The system of claim 1 wherein said processor is connected to a battery backup power supply.

14. The system of claim 1 further including an alarm that actuates when said processor sends said actuation signal.

15. The system of claim 1 wherein said processor is connected to at least one of an alarm system and a security system.

16. The system of claim 1 further including:
- a temperature sensor communicating with said processor, said processor sending said actuation signal to said controlled shut-off device to move said controlled shut-off device toward said closed position when input from said main utility sensor, said occupancy sensor and said temperature sensor indicates occurrence of an abnormal event.

17. The system of claim 16 wherein said occurrence of said abnormal event is indicated when said temperature sensor detects freezing temperatures, said occupancy sensor detects that said building is unoccupied and said main utility sensor indicates that said utility is being used in excess of a specified unoccupied amount or being used continuously in excess of a specified unoccupied period of time.

18. The system of claim 1 wherein said utility is one of gas utility, an electric utility and a water utility and said system further includes:
- a second controlled shut-off device on a second utility system main supply line that supplies one of the other of said gas utility, said electric utility and said water utility, said second controlled shut-off device bias toward a second device open position and movable toward a second device closed position upon receipt of said actuation signal from said processor.

19. The system of claim 1 wherein said occupancy sensor is one of a motion sensor, a vibration sensor and an audible sensor.

20. A system for monitoring and controlling utility systems, comprising:
- a water main supply line for supplying water to a building;
- a gas main supply line for supplying gas to said building;
- an electric main supply line for supplying electricity to said building;
- a controlled main water valve on said water main supply line that selectively prevents water from passing therethrough;
- a controlled main gas valve on said gas main supply line that selectively prevents gas from passing therethrough;
- a controlled main electric switch on said electric main supply line that selectively prevents electricity from passing therethrough;
- a main water sensor on said water main supply line for monitoring the flow of water therethrough;
- a main gas sensor on said gas main supply line for monitoring the flow of gas therethrough;
- a main electric sensor on said electric main supply line for monitoring the flow of electricity therethrough;
- at least one occupancy sensor in said building to monitor occupancy of said building; and
- a processor that (1) receives feedback from said main water, gas and electric sensors and from said at least one occupancy sensor, (2) processes said feedback and (3) controls said controlled main water valve, said controlled main gas valve and said controlled main electric switch based on the processed feedback.

21. The system of claim 20 wherein said processor closes one of said controlled main water valve, controlled main gas valve and controlled main electrical switch when said corresponding main water sensor, main gas sensor or main electric sensor indicates that a corresponding one of water, gas and electricity is one of:
- (i) being used in excess of a specified unoccupied amount and (ii) being used continuously in excess of a specified unoccupied period of time, when said occupancy sensor indicates that said building is unoccupied; and
- (i) being used in excess of a specified occupied amount and (ii) being used continuously in excess of a specified occupied period of time, when said occupancy sensor indicates that said building is occupied.

22. The system of claim 20 wherein communication between said processor and at least one of said controlled main valve, controlled main gas valve, controlled electric switch, main water sensor, main gas sensor, main electric sensor and said at least one occupancy sensor occurs wirelessly.

23. The system of claim 20 wherein said processor is connected to a battery backup power supply.

24. The system of claim 20 further including an alarm that actuates when said processor closes one of said controlled main water valve, controlled main gas valve or controlled main electric switch.

25. The system of claim 20 wherein the processor is connected to at least one of an alarm system and a security system.

26. A system for monitoring and controlling at least two utility systems, comprising:
- a first utility system main supply line for supplying a utility to at least one of a structure, an area and a building;
- a first controlled shutoff device on said first utility system main supply line, said first controlled shutoff device biased toward an open position and moveable toward a closed position upon receipt of an actuation signal wherein said utility is prevented from passing by said controlled shutoff device;
- a first main utility sensor on said first utility system main supply line;
- an occupancy sensor in said building that detects occupancy;
- a second utility system main supply line for supplying a second utility to said at least one of a structure, an area and a building;
- a second controlled shutoff device on said second utility system main supply line, said second controlled shutoff device biased toward an open position and moveable toward a closed position upon receipt of an actuation signal wherein said second utility is prevented from passing by said second controlled shutoff device;

a second main utility sensor on said second utility system main supply line; and a processor communicating with said first and second controlled shutoff devices, said first and second utility sensors and said occupancy sensor, said processor sending said actuation signal to at least one of said first and second controlled shutoff devices to move said at least one of said first and second controlled shutoff devices toward said closed position when input from at least one of said first and second main utility sensors along with said occupancy sensor indicates occurrence of an abnormal event.

* * * * *